United States Patent [19]

Yamamoto et al.

[11] Patent Number: 4,893,140
[45] Date of Patent: Jan. 9, 1990

[54] SINGLE-LENS REFLEX CAMERA WITH BUILT-IN FLASH

[75] Inventors: Masato Yamamoto; Susumu Koshino; Toshimasa Yamanaka; Koji Sato; Akihiro Arai; Masahiro Kionuma, all of Tokyo, Japan

[73] Assignee: Asahi Kogaku Kogyo Kabushiki Kaisha, Tokyo, Japan

[21] Appl. No.: 934,055

[22] Filed: Nov. 24, 1986

[30] Foreign Application Priority Data

| Nov. 22, 1985 | [JP] | Japan | 60-261238 |
| Dec. 4, 1985 | [JP] | Japan | 60-271373 |
| Dec. 25, 1985 | [JP] | Japan | 60-198374[U] |
| Jan. 31, 1986 | [JP] | Japan | 61-11595[U] |
| Feb. 5, 1986 | [JP] | Japan | 61-14482[U] |

[51] Int. Cl.$^4$ .............................................. G03B 15/03
[52] U.S. Cl. ................................. 354/149.11; 354/126; 354/149.1
[58] Field of Search ................. 354/126, 145.1, 149.1, 354/149.11

[56] References Cited

U.S. PATENT DOCUMENTS

| 3,223,010 | 12/1965 | Rentschler et al. | 354/149.11 |
| 3,299,788 | 1/1967 | Ackermann et al. | 354/126 |
| 3,869,604 | 3/1975 | Prochnow | 354/145.1 |
| 4,319,818 | 3/1982 | Sawara | 354/145.1 |
| 4,350,420 | 9/1982 | Engelsmann et al. | 354/149.11 |
| 4,452,519 | 6/1984 | Fraser et al. | 354/126 |
| 4,452,520 | 6/1984 | Kaplan | 354/126 |
| 4,525,046 | 6/1985 | Takaoka et al. | 354/149.11 |
| 4,557,571 | 10/1985 | Reibl | 354/149.11 |
| 4,603,953 | 8/1986 | Watanabe | 354/126 |

FOREIGN PATENT DOCUMENTS

| 0087028 | 7/1981 | Japan | 354/149.11 |
| 56-87029 | 7/1981 | Japan . | |
| 18054183 | 7/1983 | Japan . | |
| 0208735 | 12/1983 | Japan | 354/149.11 |
| 18292683 | 12/1983 | Japan . | |
| 18292783 | 12/1983 | Japan . | |
| 18292883 | 12/1983 | Japan . | |

Primary Examiner—Russell E. Adams
Attorney, Agent, or Firm—Sughrue, Mion, Zinn, Macpeak & Seas

[57] ABSTRACT

A single-lens reflex camera with a flash unit built into the camera body above the viewing pentaprism. The unit is movable from an operating position to a non-operating position, preferably enclosed in the camera body. The built-in flash unit may be automatically closed by inserting an external flash in a flash shoe. A display panel may be included on the top of the flash unit housing.

15 Claims, 18 Drawing Sheets

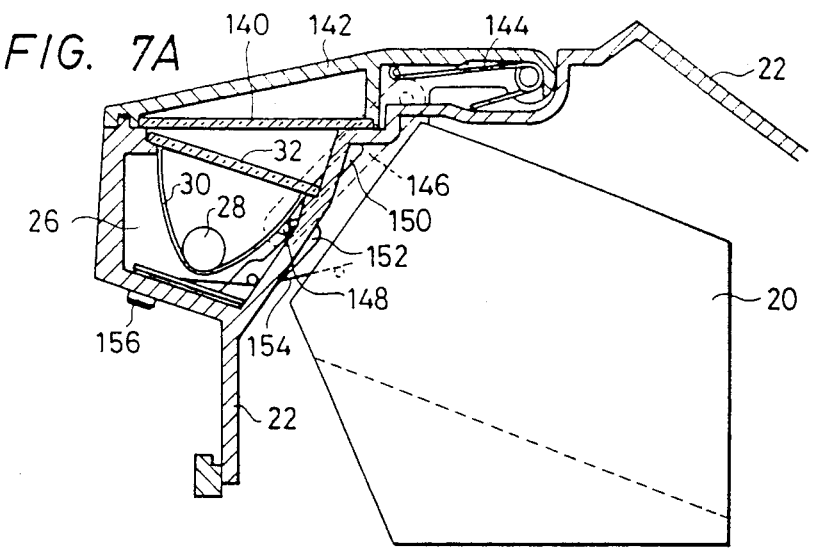
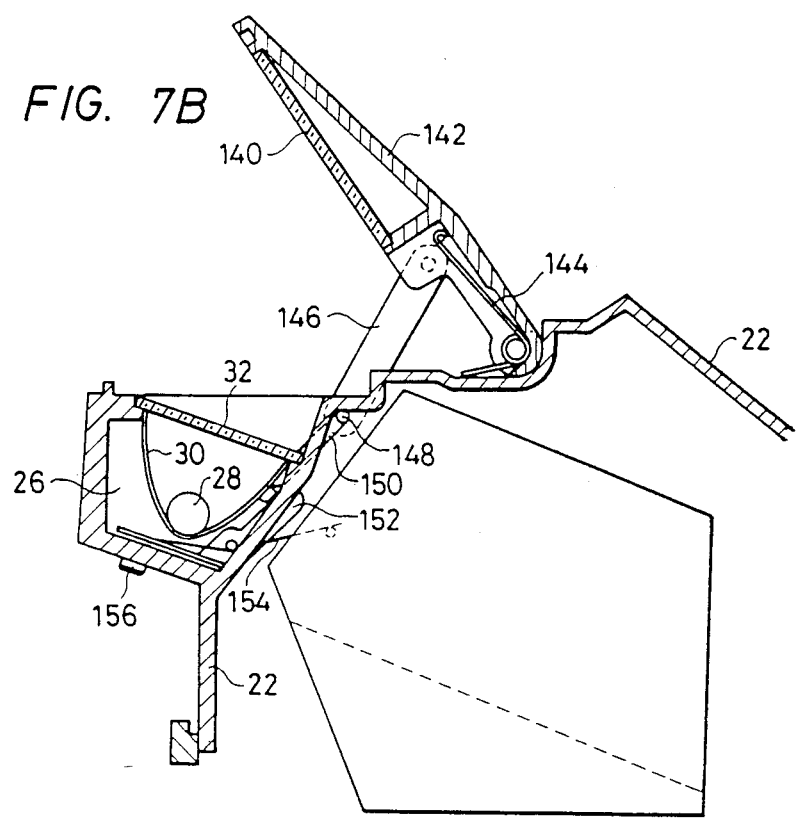

SINGLE-LENS REFLEX CAMERA WITH BUILT-IN FLASH

FIELD OF THE INVENTION

The present invention relates to a single-lens reflex camera with a built-in flash.

The present invention also relates to a built-in flash changeover mechanism which makes it possible to attach an external flash to a single-lens reflex camera having another flash built therein.

BACKGROUND OF THE INVENTION

Conventionally, a flash is attached over the pentaprism of a single-lens reflex camera every time the flash is used for photography. If the flash is heavy, it is coupled to the body of the camera by a special strong coupling device.

When a flash is secured over a pentaprism, the joint of the flash and the body of a camera has such a low mechanical strength that the joint is very likely to be damaged when the camera fitted with the flash on the body of the camera is carried. For that reason, the flash needs to be attached and detached to and from the camera body at a place where the flash is used.

The number of photographers who want to perform sophisticated photography of a subject by using not only ambient light around the subject but also auxiliary light has been increasing due to the appearance of high-sensitivity films. Such photographers tend to carry flashes with them all the time.

Since an object at a very small distance is likely to be photographed under flash light by a single-lens reflex camera, it is more desirable to place a flash tube on a vertical plane containing the central optical axis of the camera than to place the flash tube at the side of the camera.

In a single-lens reflex camera of the type with an exchangeable lens, a flash is embedded in the side part of the body of the camera near its front as in a compact camera of the lens shutter type. In a single-lens reflex camera, there is mounted thereon a flash having a flash emitting section which can be protruded from the body of the camera.

Objects in a range from a very small distance to a very large distance are photographed by a single-lens reflex camera, particularly a single-lens reflex camera of the lens exchange type. The lens of the camera of the lens exchange type is often replaced with another one of appropriate focal length. For that reason, when a flash is built in the single-lens reflex camera, it is necessary to avoid making its lens barrel intercept light emitted from the flash. However, in a conventional single-lens reflex camera, having a flash, a light emitting section is located near, beside the lens of the camera. For that reason, the light from the flash of the conventional single-lens reflex camera does not sufficiently illuminate an object when a long lens barrel is attached to the camera.

When a flash is used to photograph a flower, an insect or the like at a small distance by a single-lens reflex camera, it is desirable to irradiate light upon the object from the central part of the camera. For that reason, the flash is secured over the pentaprism (view ping prism) of the camera by electric contacts provided over the rear of the pentaprism. However, the structural strength of the secured portion of the flash is so low that the connecting portion is likely to be damaged. It is impossible to photograph an object at a very small distance by a compact camera of the lens shutter type. As for a single-lens reflex camera, it is desirable to easily use a flash to photograph an object at a very small distance. It is desired that a photographer not skilled in single-lens reflex photography can more easily use a flash.

A flash unit may be built into the body of a single-lens reflex camera of the lens exchange type in such a manner that the light emission means of the flash is located in the film rewinding section of the camera or in its pentaprism casing. Typically, objects at various distances including extremely small distances and very large distances are photographed by a single-lens reflex camera, particularly for a single-lens reflex camera whose lens is often replaced by other lenses of desired focal lengths. Since the performance of zoom lenses has recently been enhanced, the number of persons who usually do not use a standard lens but instead use such a zoom lens which covers the functions of a wide-angle lens, a medium-distance photographing lens and a telephoto-lens has been increasing. As for zoom lenses in general, the total length of a lens tube does not change even if the focal length of the lens is decreased for wide-angle photography. For that reason, it is necessary to build the flash in the single-lens reflex camera so that the light from the flash is not blocked by the lens barrel.

However, the light emission means of a flash built in such a conventional single-lens reflex camera is protruded nearly upwards from the body of the camera so that the light from the flash is blocked by a long barrel and therefore not enough light is irradiated upon an object to be photographed.

On the other hand, a flash for a large quantity of light is not much needed these days because high-sensitivity films such as the ISO 400 and the ISO 1000 have become available on the market. In addition, there is an increasing desire to reduce the weight of a camera, namely, to make its accessories light and compact.

In the prior art, since the light emission surface of an external flash which is attached to a conventional camera by inserting the attaching foot of the flash into the attaching shoe of the camera is placed nearer an object to be photographed, the attaching foot is placed behind the light emission surface of the external flash.

When a built-in flash is to be used which has a light emission means mounted over and in front of a pentaprism casing and is incorporated in a single-lens reflex camera, the light emission means is protruded up from the pentaprism casing. When the built-in flash is not to be used, the built-in flash is housed in the pentaprism casing.

When the built-in flash of the single-lens reflex camera is in the operational position, namely, the light emission means is protruded up from the pentaprism casing, an external flash cannot be attached to the camera because the attaching foot of the external flash cannot be completely inserted into the attaching shoe of the camera. As a result, a synchronization terminal might not be properly connected.

On yet another point, the automated control of a single-lens reflex camera has been recently so much advanced that the number of pieces of camera control information such as exposure information, film information and flash information, which are given to a photographing person, has become quite large. The space required for displaying these items of information has also become large along with the increase in the number of the items of information. For that reason, the use of a large-size display member made of an LCD display panel or the like has lately begun for such a single-lens reflex camera because of the low electric power consumption of the display member. However, it is a problem where the large-size display member should be located in the camera.

Since photography is often performed by using a flash these days, the flash is a common requirement. For that reason, various types of single-lens reflex cameras have been devised such as one with a built-in flash, which is protruded from the body of the camera at the time of use of the flash and is retracted into the body except during use for the sake of the convenience of carrying of the camera. Several such built-in flashes are a subject of this application. Since an object at a large distance is often photographed by such a single-lens reflex camera these days, a flash with a large quantity of light needs to be provided in the camera. Since the volume of the flash with the large quantity of light is large, the flash occupies a large space in the body of the camera.

However, it has been difficult to provide a large-size display member and a large-size flash in a single-lens reflex camera without degrading its handling and carrying properties.

SUMMARY OF THE INVENTION

It is an object of the present invention to overcome the above-described difficulties.

In particular, it is a purpose of the present invention to provide a single-lens reflex camera having a flash built in the body of the camera.

It is a further purpose of the present invention to provide a mechanism for lifting a built-in flash in such a manner that the light from the flash is not blocked by a lens barrel.

According to another aspect of the invention, it is a further purpose to provide a built-in flash changeover mechanism for a single-lens reflex camera, wherein a built-in flash is automatically housed in a non-operating position and replaced by an external flash when the external flash is attached to the attaching shoe of the camera while the built-in flash is withdrawn into a housed position.

It is a further purpose of the present invention to provide a camera having a flash built therein at the center of the top of the body of the camera, and particularly a single-lens reflex camera having a flash built therein over a pentaprism.

It is a further purpose of the present device to provide a single-lens reflex camera wherein a flash is built in and a large and easily-seen display member is compactly provided.

According to the present invention, a light emission means is fitted with a lifting mechanism and disposed in a housing chamber provided preferably over the front of a pentaprism casing. When the built-in flash is to be used, the light emission means is protruded up and preferably forwards out of the housing chamber by the lifting mechanism so as to avoid the above-mentioned problem. Since the light emission means is not only lifted but also moved toward an object at the time of the use of the built-in flash, the light from the flash is not blocked by the lens barrel and the height of the lifted flash can be made small.

The single-lens reflex camera according to one aspect of the present invention includes a flash light emission tube over the viewing prism and a flash light emission tube housing is manually or automatically shifted to move the flash light emission tube from a housed and tightly-closed position to an operational or protruded position in which flash light can be emitted forwards from over the viewing prism. Because of such a construction, a flash can be used with the single-lens reflex camera as easily as with a camera of the lens shutter type or a compact camera.

According to another aspect of the present invention, the light emission means of the built-in flash is moved to the non-operating position by the attaching foot of the external flash when the attaching foot is inserted into the attaching shoe mounted on the pentaprism casing of the camera. According to this aspect, even if the built-in flash is in the operational position, the light emission means of the built-in flash is housed in the non-operating position by the attaching foot of the external flash to thereby put the built-in flash in the non-operating position by the action of the attaching foot of the external flash being inserted into the attaching shoe. For that reason, even if the external flash is attached to the shoe when the built-in flash is in the used position, both the flashes never interfere with each other and the external flash can be properly operated.

In the camera provided in accordance with another aspect of the present invention and having the flash built therein, a projecting portion projects upwards and has a backward and downward slope at the center of the top of the camera. The lamp housing of the flash is rotatably supported on this slope. A switch is turned on or off depending on the turned position of the lamp housing to render the flash operable or inoperable. When the flash is placed in an operating position, the light emission surface of the lamp housing is oriented straight forwards with respect to the center of the front of the camera and the flash is put in the state of light emission operability by the switch. When the flash is placed in the non-operating position, the light emission surface of the lamp housing is oriented backwards and the flash is put in the state of light emission inoperability by the switch.

According to the present invention, the display member for showing camera control information or the like is provided on the top of a movable built-in flash section in the single-lens reflex camera. The movable flash section may be moved so as to be either housed in the body of the camera or protruded from the body.

BRIEF DESCRIPTION OF THE DRAWINGS

FIGS. 7A and 7B show a fourth embodiment of the present invention.

DETAILED DESCRIPTION OF THE PREFERRED EMBODIMENTS

Several embodiments of the present invention are hereafter described with reference to the drawings.

Figure 1A:
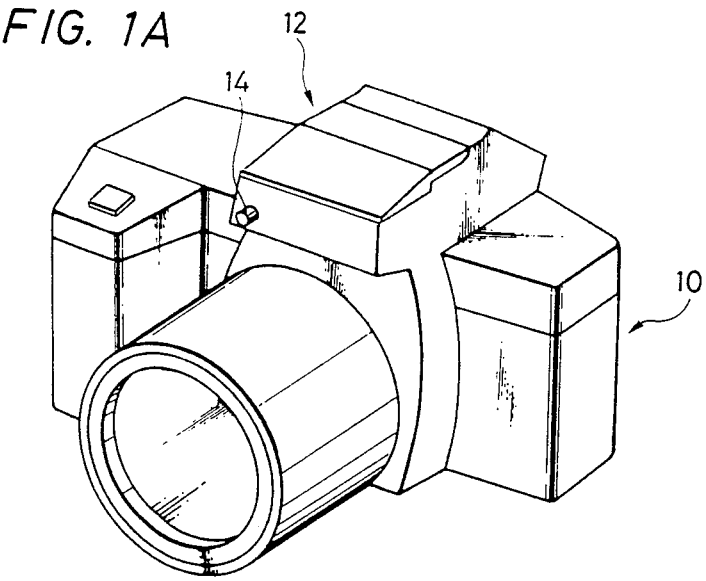
FIGS. 1A and 1B show exterior views of an embodiment of a single-lens reflex camera provided according to the present invention.
Figure 1B:
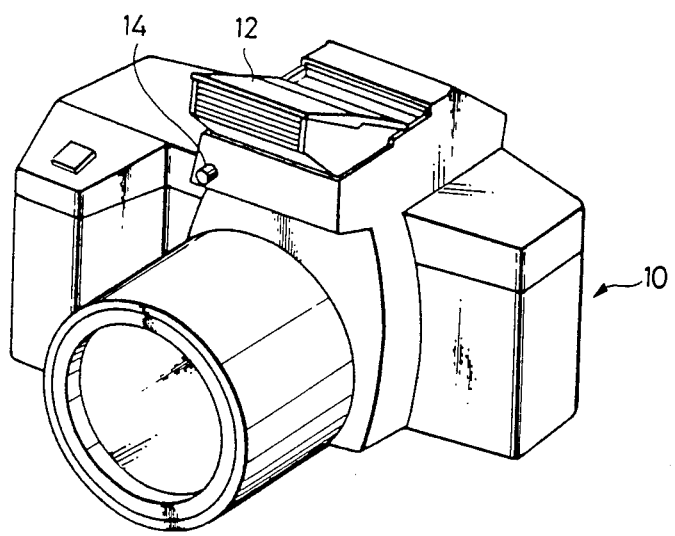

FIGS. 1A and 1B show exterior views of a single-lens reflex camera 10 according to the present invention. FIG. 1A indicates that a flash light emission tube 12 is housed over a pentaprism. FIG. 1B indicates that the tube 12 is protruded above in the forward direction to illuminate an object in order to photograph it. A push button 14 shifts the flash light emission tube 12 from a position shown in FIG. 1A to a position shown in FIG. 1B. The push button 14 is hereinafter described in detail.

Figure 2C:
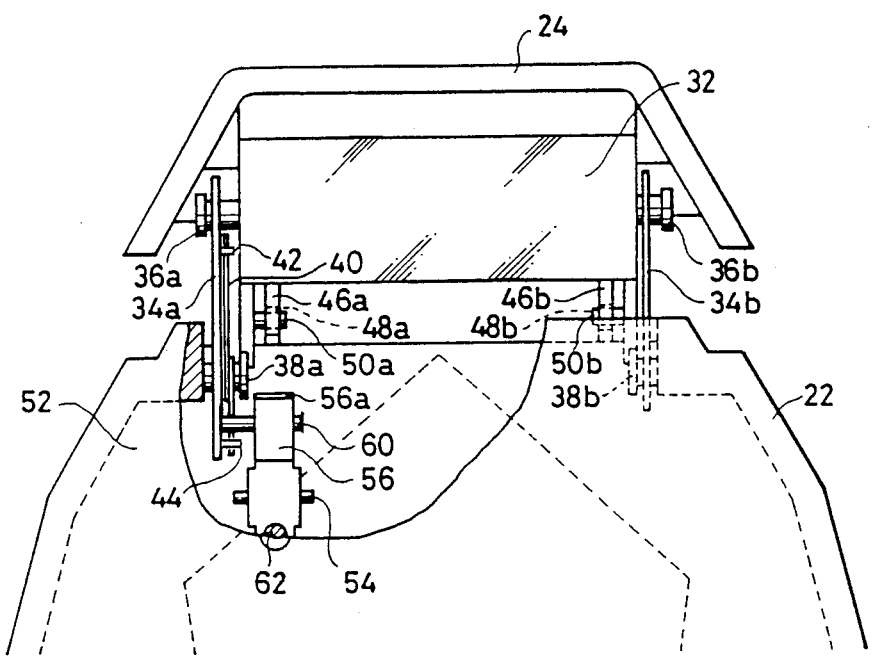
FIGS. 2A, 2B and 2C show a first embodiment of the present invention.
Figure 2A:
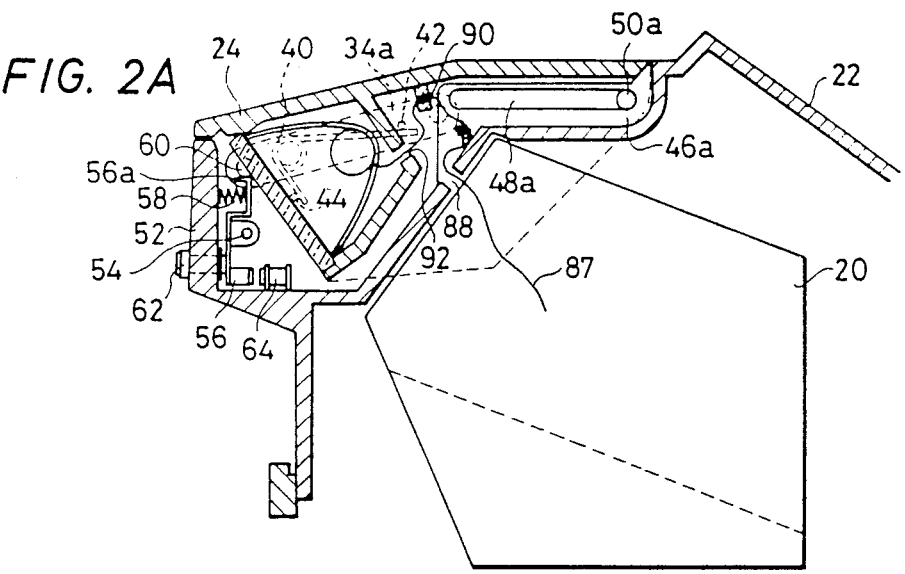
Figure 2B:
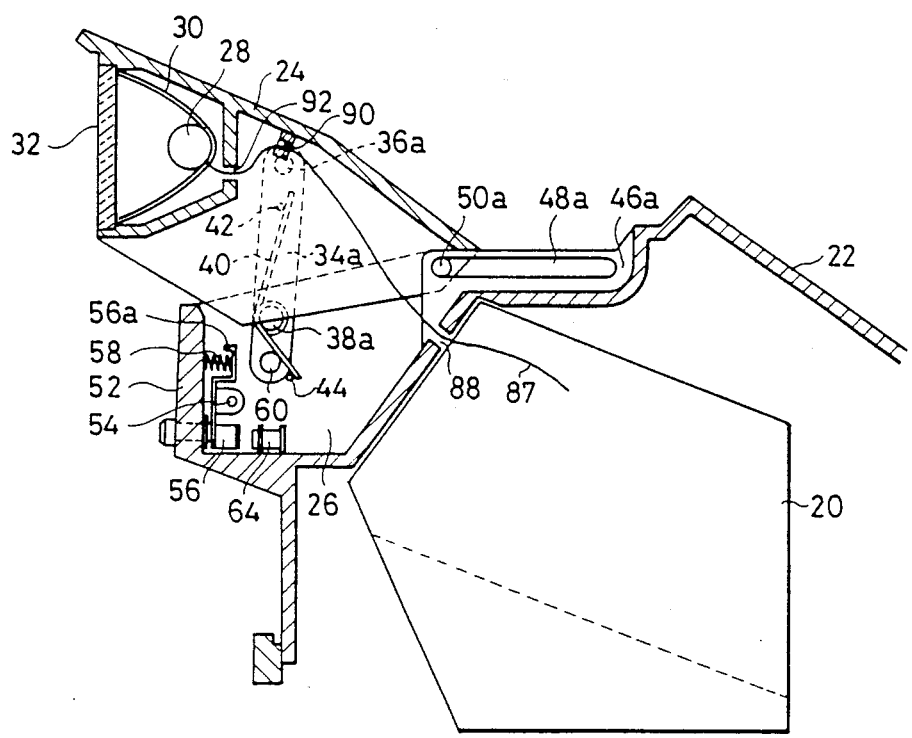

FIGS. 2A, 2B and 2C show the first embodiment of the present invention. FIGS. 2A and 2B show sectional views along a vertical place containing the photographic optical axis of a single-lens reflex camera. FIG. 2C shows a partially cutaway view of the main part of the camera, which is seen from the front of the camera.

A pentaprism 20 is used for an optical unit for a view finder. The pentaprism 20 is provided in a pentaprism casing 22. A chamber 26 for housing a lamp support 24 is provided over the central edge of the upper front facet of the pentaprism 20. A light source unit comprising a xenon tube 28, a reflector 30 and a wind-and-dust shield glass 32 is mounted in the front portion of the lamp support 24. The xenon tube 28 extends horizontally toward the right and left ends of the camera, namely, perpendicularly to the surfaces of FIGS. 2A and 2B.

The lamp support 24 is supported by matching levers 34a and 34b located at both sides of the lamp support 24 and coupled to the pentaprism casing 22 and finally to the body of the single-lens reflex camera. The levers 34a and 34b are rotatably supported at one end of each of them by pins 36a and 36b at both the sides of the lamp support 24 behind the xenon tube 28, and are also rotatably supported near their other ends by shafts 38a and 38b on the pentaprism casing 22. At least one (34a) of the two levers 34a and 34b is provided with a spring 40 engaged at one end thereof with a secured pin 42 on the lever 34a and at the other end thereof with a secured pin 44 on the pentaprism casing 22. This spring is wound on the corresponding shaft 38a so as to apply a counterclockwise turning force to the lever 34a.

Guide plates 46a and 46b, which extend in parallel with each other in the front-to-rear direction of the camera, project from the top of the pentaprism casing 22 and have slender guide holes or grooves 48a and 48b extending in the front-to-rear direction of the camera. Guide pins 50a and 50b project from the rear portion of the lamp support 24 and are always fitted in the guide holes 48a and 48b. As a result, a force for shifting the lamp support 24 from a closed position shown in FIG. 2A to a protruded or open position shown in FIG. 2B is applied to the lamp support 24 when the lever 34a is turned counterclockwise about the shaft 38a.

A front panel 52, in front of the housing chamber 26 tightly closes the housing chamber 26 in cooperation with the lamp support 24 when the lamp support 24 is housed as shown in FIG. 2A. An engaging mechanism located inside the front panel 52 keeps the lamp support 24 in the housed position against the force of the spring 40 and either manually or automatically releases the lamp support 24 as necessary. The engaging mechanism includes a side shaft 54 which extends in the sideward direction of the camera and is secured to the front panel 52 or to the wall of the housing chamber 26. An engaging plate 56 is rotatably supported about the side shaft 54. A clockwise turning force is applied to the engaging plate 56 by a return spring 58 wound on the side shaft 54. The upper end 56a of the engaging plate 56 is horizontally bent. A pin 60 projects from a side of the lower and of the lever 34a and is located in such a position that, when the lamp support 24 is closed as shown in FIG. 2A, the pin 60 is frictionally engaged with the bent upper end 56a of the engaging plate 56 to maintain the lamp support 24 closed.

The front panel 52 is fitted with a push button 62 in a position corresponding to the lower portion of the engaging plate 56. When the push button 62 is pressed, the engaging plate 56 is turned counterclockwise about the shaft 54 to release the frictional engagement between the upper end 56a of the engaging plate and the pin 60 on the lever 34. As a result, the lamp support 24 protrudes out of the housing chamber 26 by the force of the spring 40. An electro-magnet 64 is provided at the lower portion of the panel 52 opposite the push button 62. When the electromagnet 64 is energized, it performs the same action as when the push button 62 is pressed.

Figure 3:
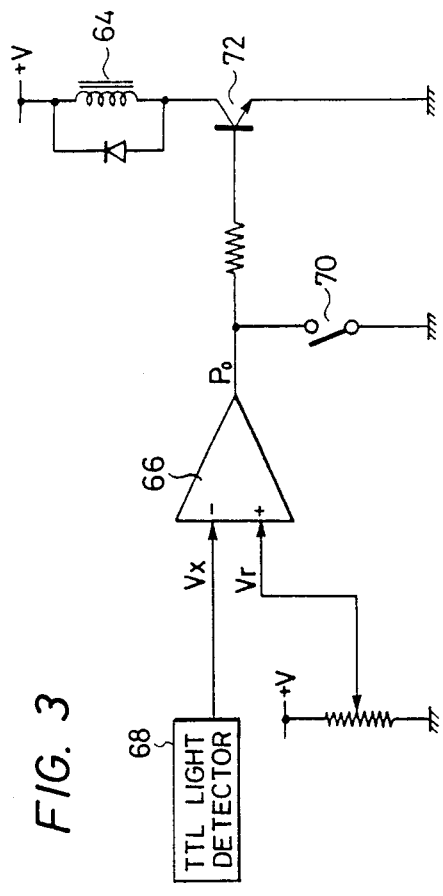
FIG. 3 shows a control circuit for an electromagnet.

FIG. 3 shows a circuit which causes the electromagnet 64 to automatically project the zenon tube 28 to the open position depending on the quantity of light from an object to be photographed. A comparator circuit 66 compares the output voltage Vx of a TTL light measuring element 68 with a reference voltage Vr. When the output voltage Vx is higher than the reference voltage Vr, the comparator circuit, 66 generates a low output L. When the output voltage Vx is not higher than the reference voltage Vr, the comparator circuit 66 generates a high output H. A normally open switch 70 connects and disconnects the output terminal of the comparator circuit 66 to ground. This switch 70 can be used to disable the automatic control circuit. The output terminal of the comparator circuit 66 is connected to the base of a PNP transistor 72. The electromagnet 64 is connected to the collector of the transistor 72. When the output voltage Vx of the TTL light measuring element 68 is not higher than the reference voltage Vr, that is, the quantity of light from the object is not larger than a prescribed value, an electrical current flows through the electromagnet 64 to turn the engaging plate 56 counterclockwise to project the lamp support 24 upwards and forwards.

Figure 4:
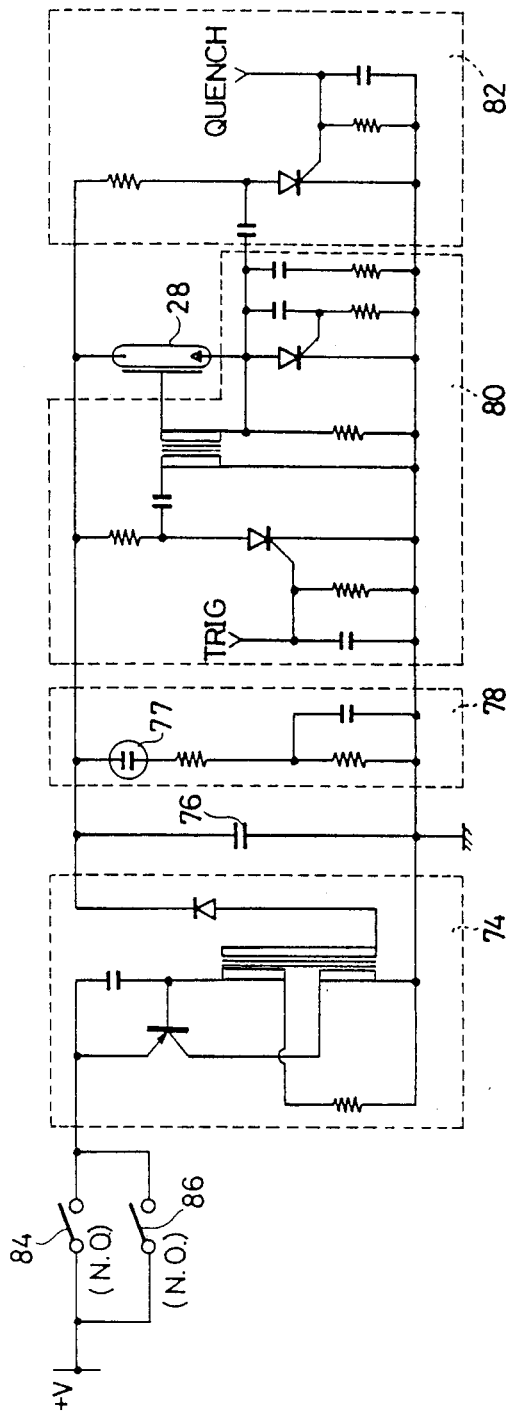
FIG. 4 shows an example of a flash circuit.

FIG. 4 shows an example of a flash circuit adopted in the first embodiment of the present invention. The flash circuit comprises a voltage increase circuit 74, a main capacitor 76, a charging completion display circuit 78 having a neon tube 77, a light emission circuit 80, the zenon tube 28 and a light emission stop circuit 82. The terminal TRIG of the light emission circuit 80 is a light emission trigger signal input terminal. The terminal QUENCH of the light emission stop circuit 82 is a light emission stop signal input terminal. The flash circuit itself is conventional. However, two normally open switches 84 and 86 are connected in parallel with each other between the voltage increase circuit 74 and a power supply +V. The first switch 84 is closed in conjunction with the protrusion of the lamp support 24. The second switch 86 is used to manually operate the flash circuit. The first switch 84 is located near one of many moving parts in this embodiment so that the switch performs its proper function.

A wire 87 for electrically connecting the light emission circuit 80 and the xenon tube 28 to each other extends from the light emission circuit 80 in the body of the camera to the xenon tube 28 through the hole 88 of the upper front portion of the pentaprism casing 22, a wire support hole 90 inside the lamp support 24 and a hole 92 of a frame which supports the reflector 30 and the xenon tube.

In the first embodiment shown in FIGS. 2A, 2B and 2C, if the quantity of light from the object is not enough, the electromagnet 64 is automatically energized to protrude the flash support 24 upward and toward the object. Meanwhile, the main capacitor 76 of the flash circuit is charged to enable the emission of flash light. When the flash is to be used regardless of the quantity of light from the object, for example, to perform synchronous photography in the daytime, the push button 62 on the front panel 52 is pressed to release the lamp support 24 to protrude it. At that time, the switch 84 is closed to charge the main capacitor 76. The manual operation switch 86 of the flash circuit is used to check the function of the flash circuit.

When the lamp support 24 protruding up and forwards is to be retracted into the housing chamber 26, the top of the lamp support 24 is pushed down. At that time, the guide pin 50a is moved down and backwards while being guided by the guide hole 48a. Also, the pin 60 at the lower end of the lever 34a slides on the bent upper end 56a of the engaging plate 56 so that the pin 60 is frictionally engaged with the bent upper end 56a. The lamp support 24 is thus engaged in the housing chamber 26.

Figure 5A:
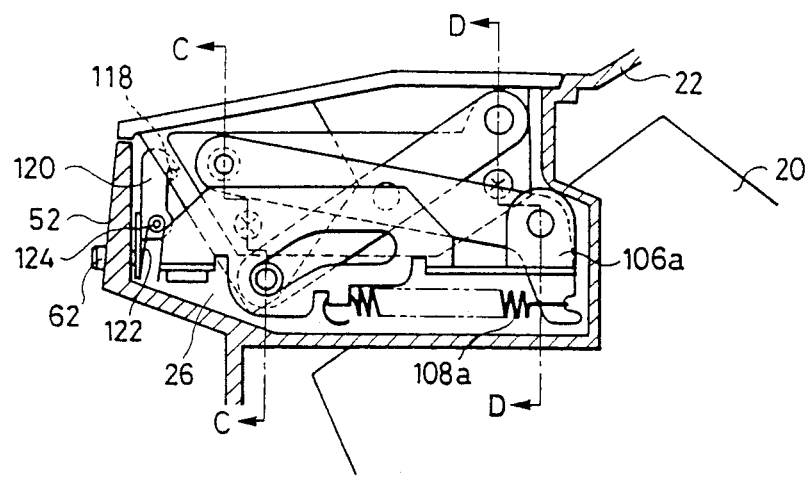
FIGS. 5A, 5B, 5C and 5D show a second embodiment of the present invention.
Figure 5B:
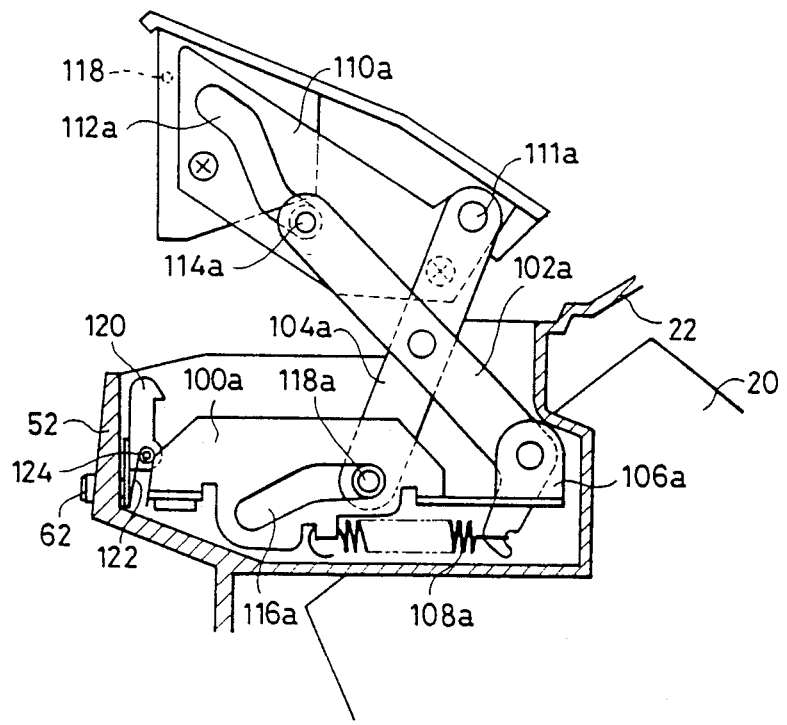
Figure 5C:
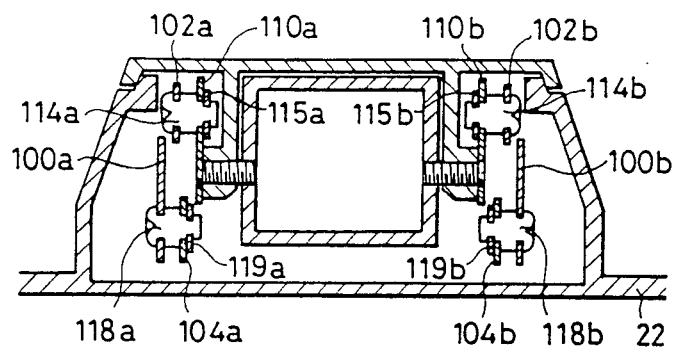
Figure 5D:
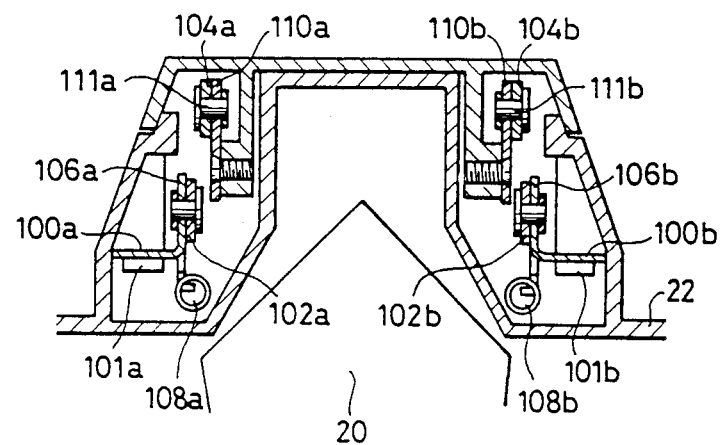

FIGS. 5A, 5B, 5C and 5D show the second embodiment of the present invention, which employs a lifting mechanism of the linkage type. FIG. 5A shows a view of the lifting mechanism in its housed position. The view is illustrated with the side wall of the housing chamber for a lamp support removed. FIG. 5B shows the lifting mechanism in a protruded or lifted position. FIG. 5C shows a sectional view along a line C—C shown in FIG. 5A. FIG. 5D shows a sectional view along a line D—D shown in FIG. 5A.

In the second embodiment, support plates 100a and 100b are secured to the right and left of the housing chamber by screws 101a and 101b at the upper front portion of a pentaprism casing 22.

The lifting linkage mechanism includes L-shaped first levers 102a and 102b and second levers 104a and 104b at the right and left of the mechanism. The first levers and the second levers are rotatably linked to each other at their central portions.

The L-shaped first levers 102a and 102b are rotatably supported at their heels on vertical projections 106a and 106b of the support plates 100a and 100b, and are biased at their lower ends by helical tension springs 108a and 108b in the forward direction or in such a direction as to be turned clockwise as illustrated in FIGS. 5A and 5B. The inner sides of the upper ends of the first levers 102a and 102b are fitted with sliding pins 114a and 114b fit into guide grooves 112a and 112b of the side plates 110a and 110b of the lamp support 24. Shown at 115a and 115b in FIG. 5C are lock washers. One of the helical springs 108a and 108b may be omitted.

The upper end of the second lever 104a is rotatably attached to the side plate 110a of the lamp support 24 by a pin 111a. The inner side of the lower end of the second lever 104a is fit with a sliding pin 118a sliding in the guide groove 116a of the support plate 100a.

The forms of the guide grooves 112a, 112b, 116a and 166b are determined depending on the actual forms and dimensions of related members so that the lifting linkage mechanism is smoothly moved up and down.

A locking pin 118 is affixed to a side portion of the lamp support 24. A hook 120, with which the locking 118 can engage when the lamp support 24 is closed, is provided inside the front panel 52 located in front of the housing chamber 26. The hook 120 is always urged clock-wise about a shaft 124 by a hair-pin spring 122. When the push button 62 on the front panel 52 is pressed, the hook 120 is turned counterclockwise to release the locking pin 118. At that time, the lamp support 24 is pushed up by the lifting linkage mechanism through the actions of the helical tension springs 108a and 108b. In the same manner as the first embodiment of FIGS. 2A-2C, the electromagnet 64 (not shown) is provided near the hook 120 to perform the same action as when the push button 62 is pressed.

The control circuit for the electromagnet 64 and the flash circuit are the same as those shown in FIGS. 3 and 4. Although FIGS. 5A, 5B, 5C and 5D do not show a wire for electrically connecting the zenon tube 28 and a light emission circuit 80 to each other, the wire can be provided in such an appropriate location as not to hinder the action of the linkage mechanism.

In the second embodiment, when the push button 62 is pressed or when the electromagnet 64 is energized due to an insufficient quantity of light from an object to be photographed, the hook 120 and the locking pin 118 are disengaged from each other to move up the lamp support 24 by the forces of the helical tension springs 108a and 108b. When the lamp support 24 is pushed in and downward, the locking pin 118 is engaged with the hook 120 to keep the lamp support 24 closed. Since the lamp support 24 is moved up high in comparison with the region of the housing chamber 26, flash light is not intercepted by a long lens unit such as a telephoto lens.

Figure 6A:
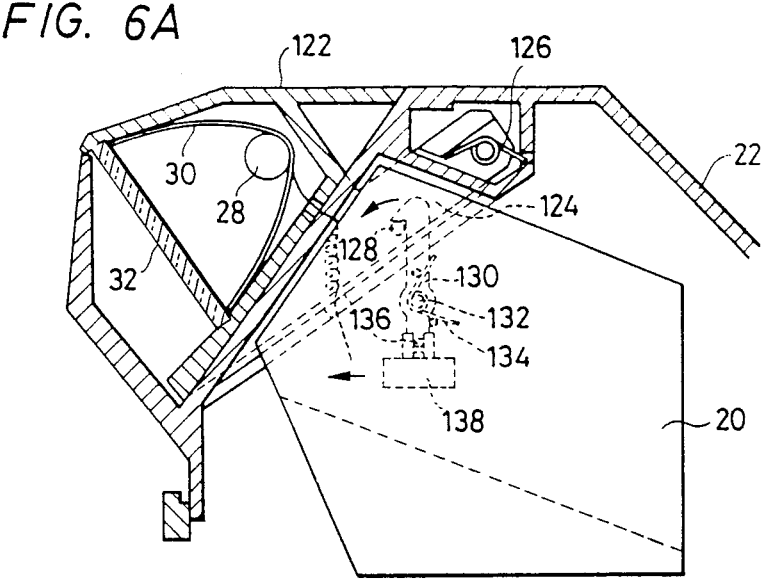
FIGS. 6A and 6B show a third embodiment of the present invention.
Figure 6B:
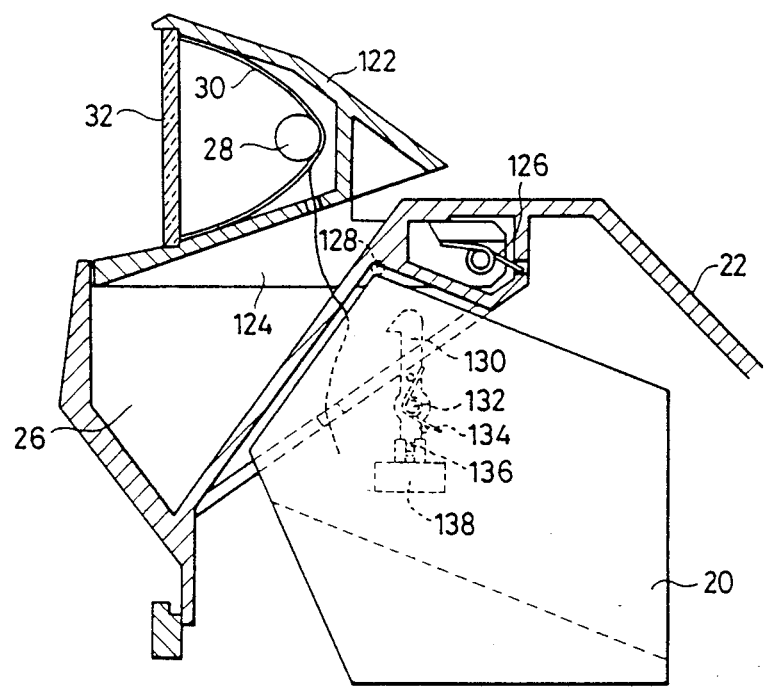

FIGS. 6A and 6B show a third embodiment of the present invention. FIG. 6A shows a sectional view of a single-lens reflex camera with a flash in a housed position, along a central vertical plane. FIG. 6B shows along the same plane a sectional view of the camera with the flash in an operational position. A lamp support 122 has a form of inverted U in the plan view of the lamp support. Legs 124 of the lamp support 124 are located at both the sides of the xenon tube 28 and are supported at their rear ends on the pentaprism casing 22. At least one of the supported rear end portions of the legs 124 is wound with a spring 126 which is engaged at one end thereof with the step of the corresponding leg 124 and at the other end thereof in a hole in the pentaprism casing 22. The spring 126 acts to turn the lamp support 122 clockwise in FIGS. 6A and 6B.

A locking pin 128 extending to the side is affixed to the mid-section of the leg 124. A hook 130, which is engaged with the locking pin 128 to keep the lamp support 122 housed as shown in FIG. 6A, is attached to the pentaprism casing 22 so that the hook 130 can be turned about a shaft 132 secured to the pentaprism casing 22. A spring 134 wound on the shaft 132 urges the hook 130 in such a counterclockwise direction as to turn the hook 130 to engage it with the pin 128. A pin 136 is affixed sidewards in the hook 130 beneath the shaft 132 of the hook 130. A sliding mechanism 138 can move the pin 138 forward and backward. A portion of the sliding mechanism 138 is exposed at a side of the pentaprism casing 22 so that when the exposed portion is moved forward by the photographer, the sliding mechanism is displaced forward to move the pin 136 forward. When the sliding mechanism 138 is displaced forward from a position shown in FIG. 6A, the hook 130 is turned counterclockwise to release the locking 128. It is desirable that an electromagnet for turning the hook 130 counterclockwise depending on the quantity of light from a photographed object to release the engaging pin 128 is provided at the hook 130 as in the first embodiment shown in FIGS. 2A, 2B and 2C.

All that needs to be done to shift the lamp support 122 from a housed position to a protruded or used position in the third embodiment is to displace the sliding mechanism 138 forward. When the sliding mechanism 138 is displaced forward, the pin 128 is disengaged from the hook 130 so that the lamp support 122 is protruded out of a housing chamber 26 by the force f the spring 126. When a magnet drive circuit shown in FIG. 3 is adopted in the third embodiment, the electromagnet is energized when the quantity of light from the object is smaller than a prescribed value, so as to turn the hook 130 counterclockwise to protrude the lamp support 122.

All that needs to be done to shift the lamp support 122 from the protruded position to the housed position is push the lamp support into the housing chamber 16. When the lamp support 122 is pushed into the housing chamber, the engaging pin 128 slightly turns the hook 130 counterclockwise while sliding on the head of the hook, and is finally placed under the head of the hook. Even if the photographer's hand is then removed from the lamp support 122, the hook 130 holds the engaging pin 128 stationary by the force of the spring 134 so that the lamp support 122 is kept in the housed position. In the third embodiment, the mechanism for lifting the lamp support 122 is very simple and can be manufactured at a low cost.

FIGS. 7A and 7B show the fourth embodiment of the present invention. FIG. 7A shows a sectional view of a single-lens reflex camera with a flash in a housed position, along a central vertical plane. FIG. 7B shows along the same plane a sectional view of the camera with the flash in an operational position. In this embodiment, the lamp is neither protruded nor lifted, but instead a mirror 140 is lifted. The xenon tube 28, the reflector 30 and the wind and dust shield glass 32 are secured in the housing chamber 26 and oriented so that flash light is obliquely projected up and backwards. The mirror 140 and a mirror support 142 are provided so that they cover the housing chamber 26. The mirror support 142 is rotatably supported at its rear end on the to top of the pentaprism casing 22. A spring 144 wound on a shaft for rotatably supporting the mirror support 142 is provided to always bias the mirror support 142 in such a clockwise direction as to turn the mirror support to move the mirror 140 to a position in which light from the xenon tube 28 is reflected forwards by the mirror.

One end of a lever 146 is rotatably attached to the mid-section of the mirror support 142. A pin 148 is affixed to a side of the lever 146 at its other end and fitted in the guide groove 150 of the side wall of the housing chamber 26. The guide groove 150 and the pin 148 are positioned so that the mirror 140 is placed at an appropriate angle when the pin 148 comes to the upper end of the guide groove 150 in the upward movement of the mirror support 142. At least one the opposed sides of the camera is provided with the group of the lever 146, the pin 148 and the guide groove 150.

A hook 152 for engaging the pin 148 to a standstill as the mirror 140 is moved down is provided at the bottom of the housing chamber 26. The hook 152 is dog-legged as a whole, supported at its center, and always biased by a spring 154 in such a direction as to engage the pin 148 to be stationary. When a push button 156 exposed outside is pressed, the hook 152 is turned clockwise against the force of the spring 154. The hook 152 can be turned clockwise by an electromagnet (not shown) in the same manner as the preceding embodiments. The electromagnet is not shown in the drawings.

In the fourth embodiment, the xenon tube 28 is secured in a stationary position. For that reason, a wire for electrically connecting the xenon tube 28 to the flash circuit may be secured and therefore can be laid easily through a hole provided in a portion of the pentaprism casing 22.

The mirror 140 may be any of a plane mirror, a convex mirror and a concave mirror, and can be replaced depending on the focal length of a photographing lens.

When the flash is to be used, the push button 156 is pressed to turn the hook 152 clockwise to release the pin 148. As a result, the mirror support 142 is turned clockwise by the spring 144 and stopped in a position where the pin 148 comes to the upper end of the guide groove 150. When the quantity of light from an object to be photographed is small, the electromagnet is energized to turn the hook 152 clockwise to move up the mirror 140 in the same manner as when the push button 156 is pressed. After the flash is used, all that needs to be done is push down the mirror support 142. When the mirror support 142 is pushed down, the pin 148 is guided by the guide groove 150, pushes away the head of the hook 152, and is then engaged in a stationary position by the hook 152. As a result, the housing chamber 26 is tightly closed by the mirror support 142.

Figure 8A:
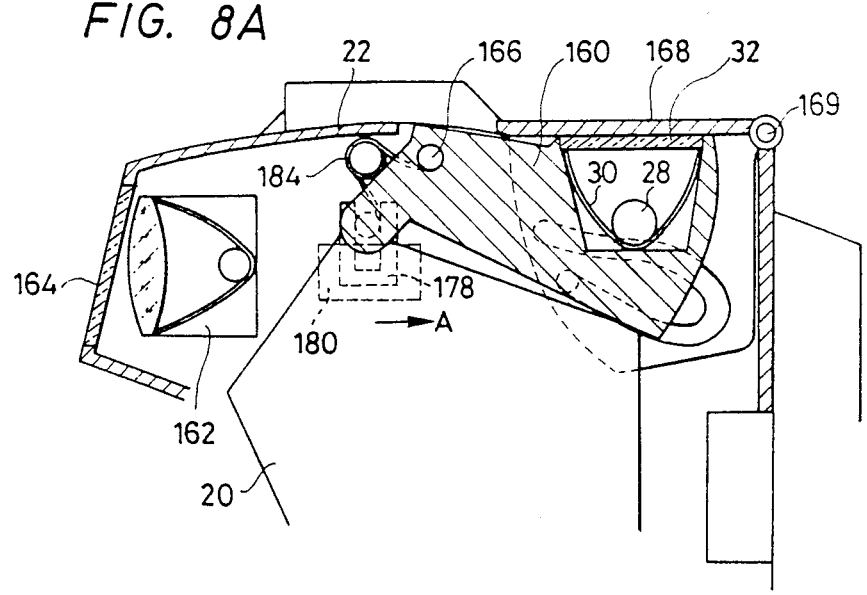
FIGS. 8A, 8B, 9A and 9B show a fifth embodiment of the present invention.
Figure 8B:
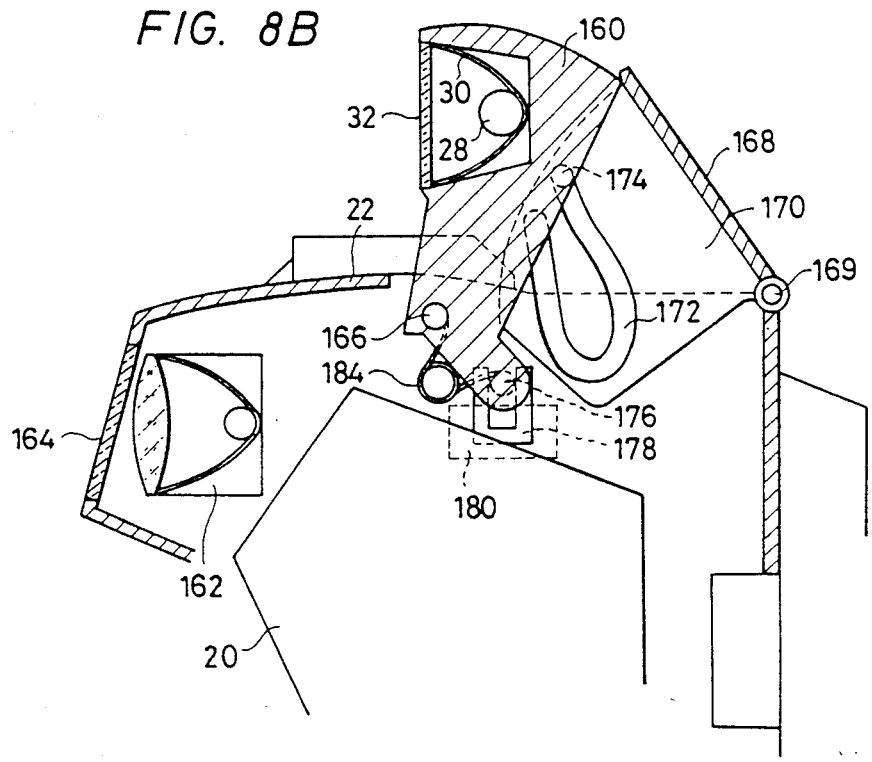
Figure 9A:
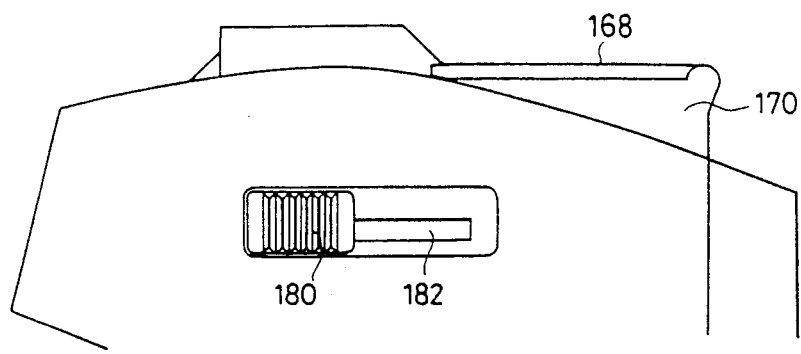
Figure 9B:
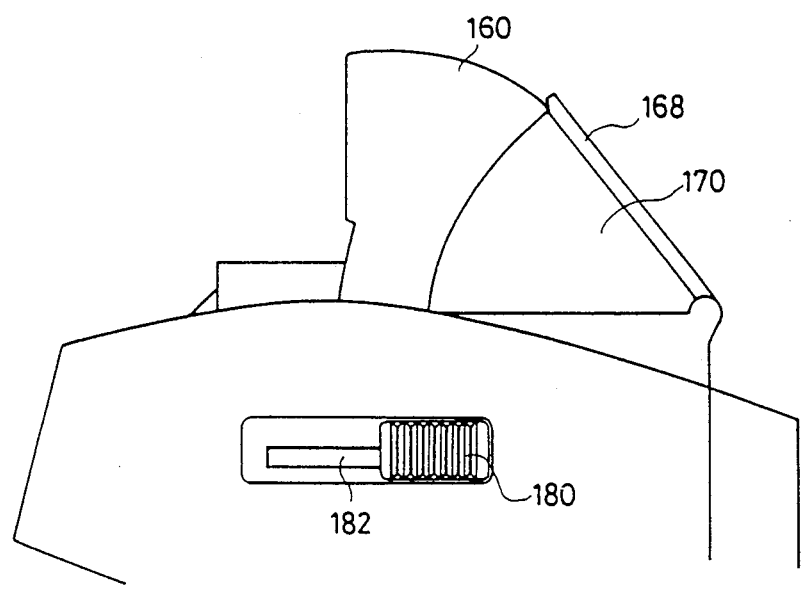

FIGS. 8A, 8B, 9A and 9B show the fifth embodiment of the present invention. FIG. 8A shows a sectional view of a single-lens reflex camera with a lamp in a housed position, along a central vertical plane. FIG. 8B shows along the same plane the camera with the lamp in a used position. FIG. 9A shows an exterior side view of the camera with the lamp in the housed position. FIG. 9B shows an exterior side view of the camera with the lamp in the used position. In this embodiment, a lamp support 160 is provided over the upper rear facet of the pentaprism 20. Since a space is defined over the upper front facet of the pentaprism 20, an auxiliary lamp 162 may be secured in the space. In that case, a wind and dust shield glass 164 needs to be provided in front of the auxiliary lamp 162.

The lamp support 160 is supported to the pentaprism casing 22 by a shaft 166 located over the center of the pentaprism 20 and extending toward the sides of the camera. When the lamp support 160 is in a housed position, the shield glass 32 extends horizontally and a protective cover 168 covers the top of the support 160. The protective cover 168 is rotatably attached to the camera by a shaft 169 provided at the intersection of the top and rear of the camera. Guide plates 170 are provided at both the sides of the lamp-holding portion of the lamp support 160 and located on the right and left of the cover 168. The side portion of each guide plate 170, which faces the lamp support 160, has a guide groove 172 whose form is determined so that the cover 168 follows the rear of the lamp support 160 when the lamp support is turned about the shaft 166. A guide pin 174, which is fitted in the guide groove 172, is affixed to the side of the lamp support 160.

Pins 176 project from both the sides of the lamp support 160 near the shaft of 166 of the lamp support 160. Each pin 176 is pinched between the legs of a U-shaped engaging member 178 coupled at a slender-cross-section hole 182 to a slider 180 exposed outside. When the slider 180 is moved in a direction A shown in FIG. 8A, the lamp support 160 is turned counterclockwise about the shaft 166 so that the lamp support is put in a position shown in FIG. 8B. A snap spring 184 is acts against both the shaft 166 and the pin 176 to keep the lamp support 160 either housed or protruded.

In this embodiment, an optical unit for a view finder, which includes the pentaprism, is sealed from the lamp support 160 and its lifting mechanism in order to prevent external light and dust from entering into the optical unit when the lamp support is housed or protruded, although such a sealing means is not shown in the drawings. An electromagnet may be provided to protrude the lamp support 160 depending on the quantity of light from the object in the same manner as the preceding embodiments. When the sliders 180 provided at both the sides of the pentaprism casing are pushed inwards and pulled backwards, the lamp support 160 is protruded. When the protruded lamp support 160 is to be housed, it is pushed in by a hand.

According to the present invention, a light emission tube is integrally provided over the pentaprism of a single-lens reflex camera, as described above. For that reason, flash photography, daytime synchronous photography and the like can be performed by the camera as easily as in a conventional compact camera. Although a connection for a separated-type flash which is manufactured separately from a conventional camera and coupled thereto in the use of the flash has such a low mechanical strength that the connection is very likely to be damaged, the connection of the single-lens reflex camera provided according to the present invention has a high mechanical strength because the flash is built into the single-lens reflex camera.

According to the above embodiments of the present invention, the top of the single-lens reflex camera is made flat over its pentaprism so that the degree of freedom of positioning of a large-size LCD panel, which recently is often provided on the top of such a camera, is increased.

Figure 10:
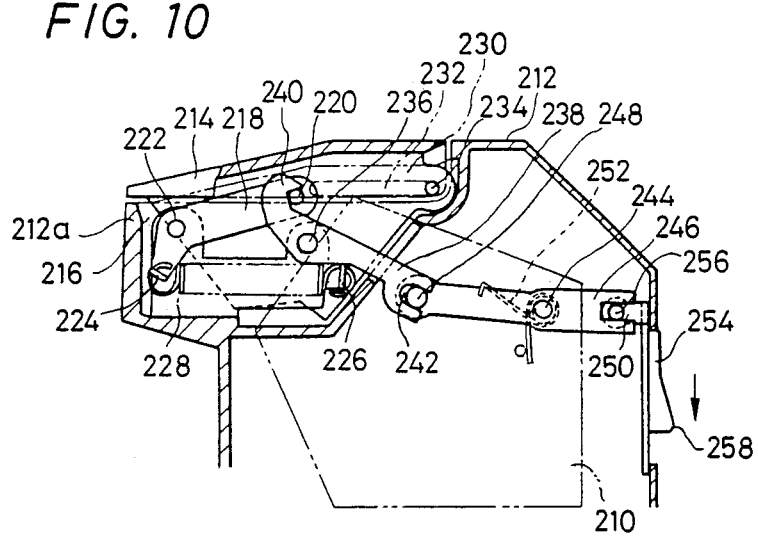
FIG. 10 shows a sectional view of a sixth embodiment of the present device, which is a single-lens reflex camera with a flash in a housed position.
Figure 11:
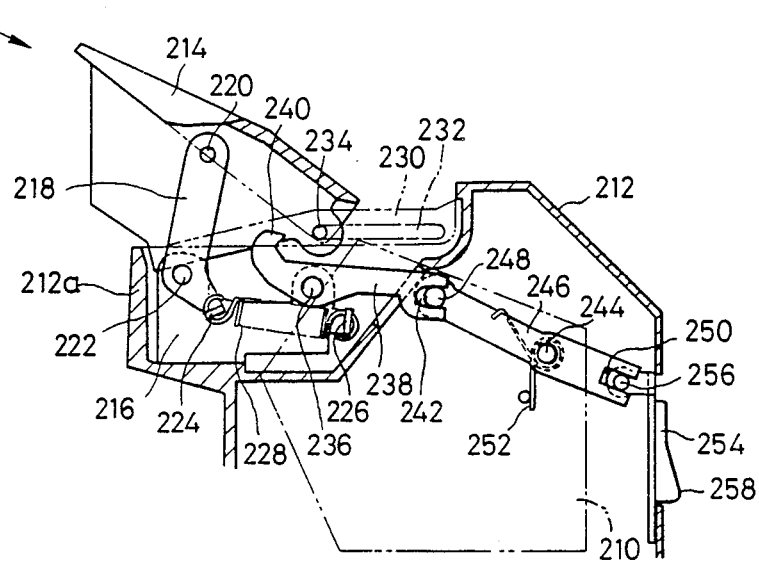
FIG. 11 shows a sectional view of the camera of FIG. 10 with the flash in a lifted position.

A sixth embodiment of the present device is hereafter described with reference to the drawings. FIGS. 10 and 11 show sectional views of a single-lens reflex camera along a central vertical plane containing the photographic optical axis of the camera to which the embodiment is applied.

A pentaprisum 210 is used as an optical unit for a view finder. The pentaprism 210 is provided in a pentaprism casing 212. A lamp support 214 serves for a light emission means comprising a xenon tube, a reflector and a wind and dust shield glass not shown in these drawings. A housing chamber 216 for the lamp support 214 is provided over the central edge of the upper front facet of the pentaprism 210.

The lamp support 214 is supported by the pentaprism casing 212 and finally by the body of the camera, through levers 218 (only one of which is shown in the drawings) located at both the sides of the lamp support 214. Each lever 218 is rotatably attached at one end to the middle portion of the side of the lamp support 214 by a pin 220, while the lever 218 is rotatably supported near the other end by a shaft 222 on the pentaprism casing 212. At least one of the two levers 218 is provided with an engaging projection 224 opposite the pin 220 across the shaft 222. A tension spring 228 is provided on the engaging projection 224 and projection 226 affixed to the pentaprism casing 212. The tension spring 228 biases the lever 218 so as to turn it clockwise.

Figure 12:
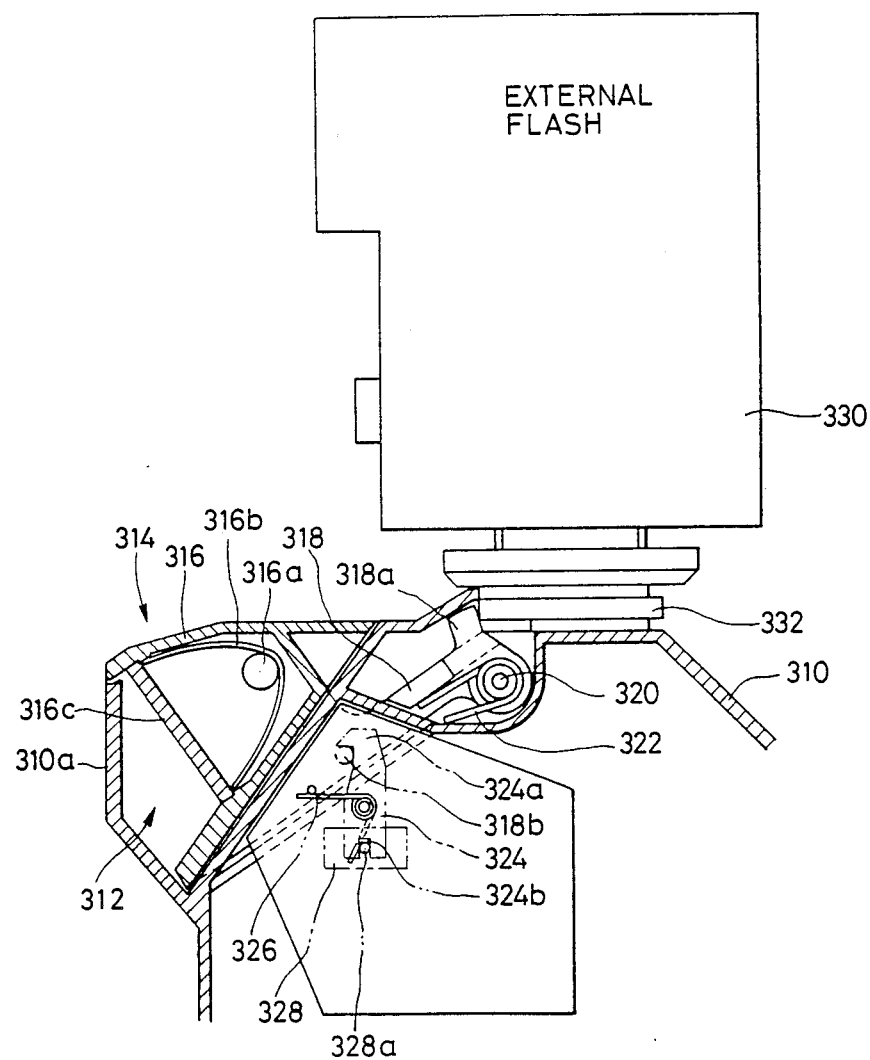
FIG. 12 shows a sectional view of a single-lens reflex camera which is seventh embodiment of the present device and is fitted with an external flash in a shoe.
Figure 13:
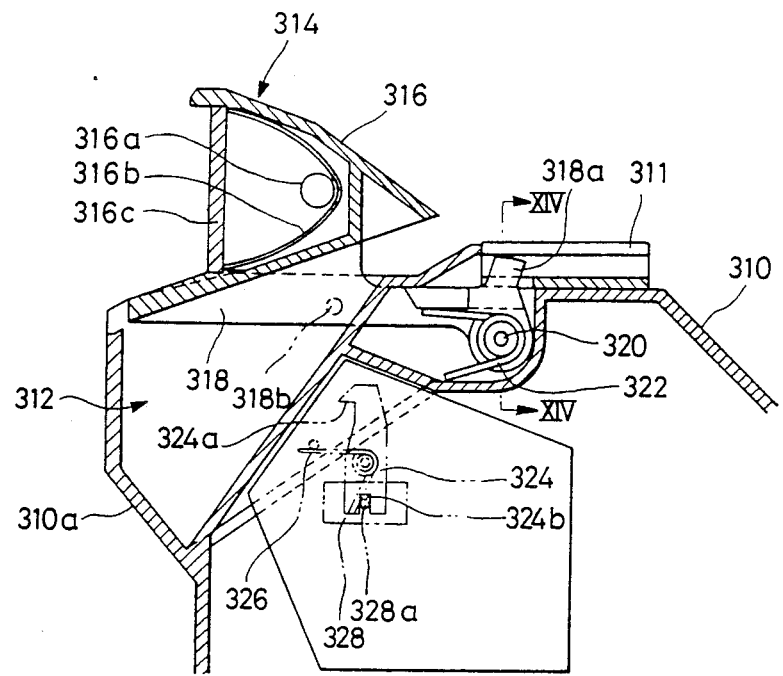
FIG. 13 shows a sectional view of the camera with a built-in flash in a used position.

A seventh embodiment of the present device, which is a single-lens reflex camera to be used with an external flash, is hereafter described in detail. FIGS. 12 and 13 show sectional views of the camera along a vertical plane containing the photographic optical axis of the camera. FIG. 12 shows the camera fitted with an external flash. FIG. 13 shows the camera with a built-in flash in a used position.

An upper cover 310 of the pentaprism casing is located at the top of the body of the camera. A shoe 311 is secured to the top of the upper cover 310. A housing chamber 312 is provided near the front 310a of the upper cover 310. The light emission means 314 of the built-in flash is housed in the housing chamber 312. The light emission means 314 includes a housing 316 containing a xenon tube 316a and a reflector 316b and having a dust and wind shield lens 316c located in front of the reflector 316b and covering the xenon tube 316a and the reflector 316b.

Levers 318 are integrally provided on both the sides of the bottom of the housing 316. The rear ends of the levers 318 are rotatably attached to the upper cover 310 by a shaft 320. The levers 318 are swung about the shaft 320 to move the light emission means 314 between an non-operational position in which it is housed in the housing chamber 312 and an operational position in which the light emission means 314 is protruded from the front 310a of the upper cover 310. When the light emission means 314 is in the non-operational position, the top of the housing 316 serves as a part of the upper cover 310 to close the housing chamber 312.

Figure 15:
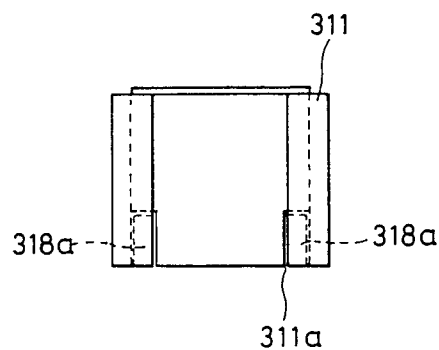
FIG. 15 shows a plan view of the shoe.

Each lever 318 is provided with a projection 318a near the shaft 320. When the light emission means 314 is housed inside the front 310a of the upper cover 310, the projection 318a is located inside the upper cover 310. As shown in both FIGS. 13 and 15, when the light emission means 314 is protruded up from the front 310a of the upper cover 310 in order to be used, the projection 318a is fitted in the notch 311a of the shoe 311.

Figure 14:
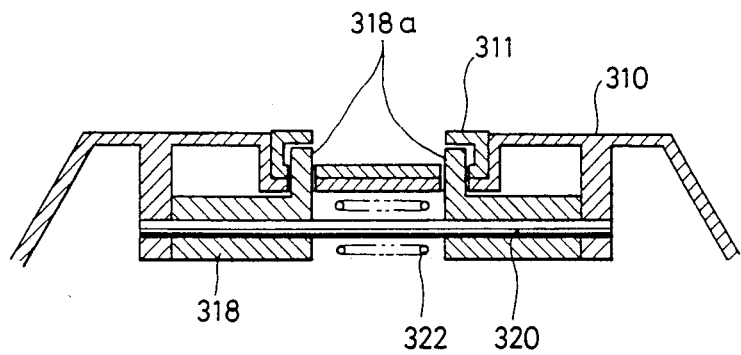
FIG. 14 shows a sectional view along a line XIV—XIV shown in FIG. 2.

A helical spring 322 is wound on the shaft 320. One end of the spring 322 is engaged with the lever 318, while the other end of the spring is engaged with the inside surface of the upper cover 310. The spring 22 always biases the lever 318 in the clockwise direction of FIGS. 12 and 13 so that the light emission means 314 is protruded up from the front 310a of the upper cover. A cross section of this structure is shown in FIG. 14.

A lever 324 is attached by a shaft to the inside surface of the upper cover 310 so that the lever 324 can be swung. A hook 324a, which is engaged with a pin 318b affixed to the lever 318, is provided at one end of the lever 324. A notch 24 extending in the longitudinal direction of the lever 324 is provided at the other end of the lever. A helical spring 326 is fitted on the shaft for the lever 324. One end of the spring 326 is engaged with the lever 324, while the other end of the spring is engaged with a pin planted in the upper cover 310. The spring 326 always urges the lever 324 in the counterclockwise direction of FIGS. 12 and 13 so that the hook 324a is engaged with a pin 318b for the lever 318.

A sliding button 328 is fitted on a side of the upper cover 310 so that the button 328 can slide horizontally. A portion of the button 328 is exposed through a window in the upper cover 310. A pin 328a which is fitted in the notch 324b of the lever 324, is affixed to the sliding button 328. When a photographer has slid the button 328 to the left in FIGS. 12 and 13 by operation from outside the upper cover 310, the pin 328a affixed to the button 328 is slid leftwards together with the button 328 so that the lever 324 having the notch 324b fitted with the pin 328a is turned clockwise and the hook 324a of the lever 324 and the pin 318b for the lever 318 are disengaged from each other. The lever 318 thus released form the lever 324 is turned clockwise by the biasing force of the spring 322 so that the light emission means 324 is protruded from the front 310a of the upper cover 310 and the projections 318a of the levers 18 are put in the shoe 311. As a result, the built-in flash is put in the operational position shown in FIG. 13.

When the attaching foot 332 of the external flash 330 is inserted forwards (to the left in FIG. 13) into the shoe 311 when the light emission means 314 remains protruded in the operating position of the built-in flash as shown in FIG. 13, the tip of the attaching foot 332 comes into contact with the projections 318a of the levers 318 and pushes the projections forwards to turn the levers 318 and the light emission means 314 against the biasing force of the spring 322. As a result, the light emission means 314 is returned to within the housing chamber 12. Immediately before the attaching foot 332 is completely inserted into the shoe 311, the pin 318b for the lever 318 slides on the slope of the hook 324a to first push aside the lever 324 in the counterclockwise direction and thereafter to engage with the engaging surface of the hook 324a. The light emission means 314 is thus put in the unused position so that no light is emitted from it.

A control means not shown in the drawings is provided so that when the light emission means 314 is in the unused position, the power supply for the built-in flash is disconnected and so that when the light emission means 314 is protruded in the used position, the power supply is connected to apply working power to the built-in flash.

The present device is not confined to the embodiment described above. Particularly, a lifting mechanism and an engaging mechanism which are for protruding and housing the light emission means 314 can be provided in various arrangements.

If a notch is provided in the front portion of the attaching foot 332 of the external flash 330 so as to prevent the foot 332 from coming into contact with the projections 318a of the levers 318 at the time of the insertion of the foot 332 into the shoe 311 and if a means is provided to prevent a trouble such as the external flash coming into contact with the built-in flash to hinder each other's normal operation, both the flashes can be simultaneously used as far as the external flash 330 and the housing 316 do not interfere with each other.

According to this embodiment of the present invention, a built-in flash changeover mechanism is provided as described above, so that when an external flash is attached to a shoe while a built-in flash is in a operational position, projections fitted in the shoe are pushed by the attaching foot of the external flash to return the built-in flash to an unused position so that the external flash can be surely attached to the shoe. While the external flash remains attached to the shoe, the built-in flash cannot be put in the operational position and therefore cannot unexpectedly operate.

Figure 16:
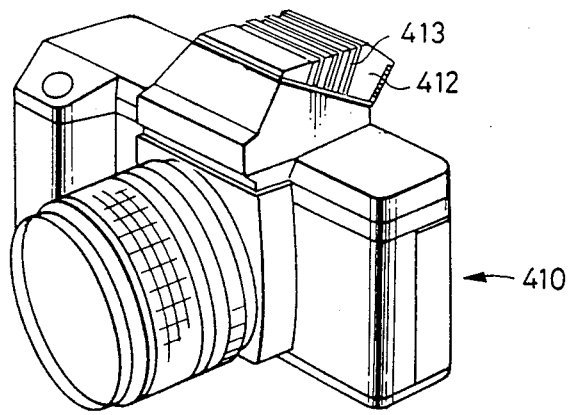
FIG. 16 shows an exterior view of a camera provided in accordance with an eighth embodiment of the present invention and having a flash in an unused position.
Figure 17:
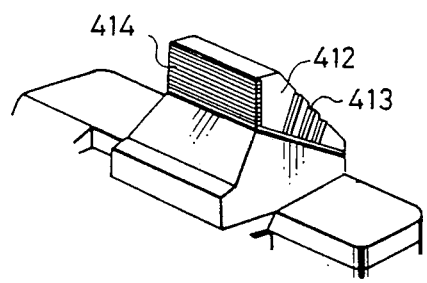
FIG. 17 shows a partial exterior view of the camera having the flash in an operational position.

An eighth embodiment of the present invention is hereafter described with reference to the drawings. FIG. 16 shows a perspective exterior view of a camera of this embodiment. FIG. 17 shows a partial view of the camera having a flash in an operating position. A body 410 of the camera has mounted thereon a lamp housing 412 wherein a flash tube and a reflector are housed. Although a light emission control circuit and a power supply for the flash tube are provided in the camera body 410, the circuit and the power supply may be partly or wholly located in the lamp housing 412.

The lamp housing 412 is rotatably supported on a backward and downward slope over the rear of the pentaprism, as shown in FIGS. 16 and 17. When a flash is not in the operating position, a light emission surface 414 of the lamp housing 412 is oriented backwards. When the flash is in the operational position, the flash housing 412 is rotated by 180 degrees to orient the light emission surface 414 forwards at such an angle as to illuminate an object located directly in front of the camera. Both the sides of the lamp housing 412 are provided with a large number of grooves 413 or projections for facilitating the manual rotation of the lamp housing. Because of esthetic design, the top of the lamp housing 412 is also provided with grooves extending to the grooves 413 of both the sides of the housing 412.

Figure 18:
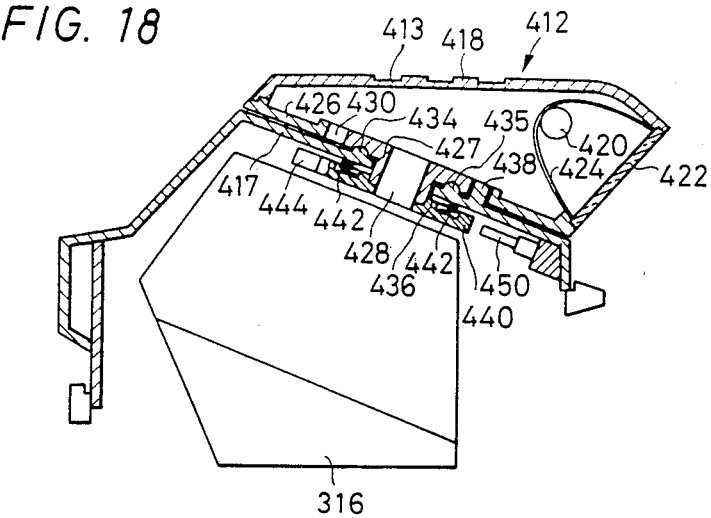
FIG. 18 shows a sectional view along a central vertical plan of the camera with the flash in the unused position.
Figure 19:
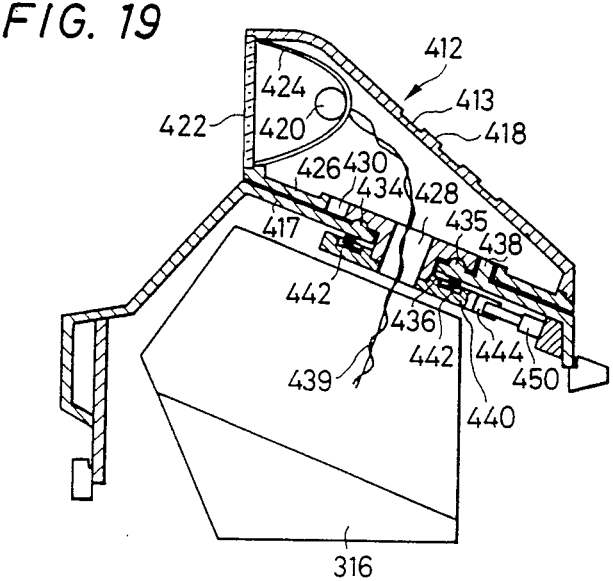
FIG. 19 shows a sectional view along the same plane of the camera with the flash in the used position.

FIG. 18 shows a sectional view along a central vertical plane of the camera with the flash in its unused position. FIG. 19 shows a sectional view along the plane of the camera with the flash in its used position. As shown in FIG. 18, the lamp housing 412 is provided on the backward downhill slope of an upper cover 417 for the pentaprism 416 so that the rear surface 418 of the lamp housing 412 set almost horizontal when the flash tube 420 faces backwards. As shown in FIG. 19, a wind and dust shield glass 422 is set vertical when the flash tube 20 faces forwards. A slender parabolic reflector 24 directs the flash light.

Figure 20:
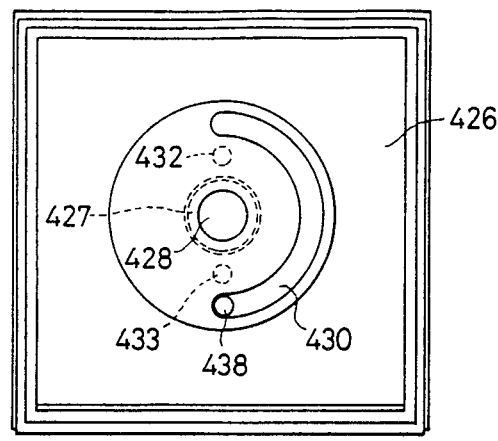
FIG. 20 shows a plan view of the bottom plate of a lamp housing.

FIG. 20 shows a plan view of a bottom plate 426 of the lamp housing 412 in the unused position of the flash.

The bottom plate 426 is provided with a shaft 427 at the center of rotation of the lamp housing 412. The shaft 427 has a through hole 428 for a wire for electric connection. The bottom plate 426 is also provided with an arc-shaped guide hole 430 extending through a rotation angle of 180 degrees and being centered on the shaft 427. The underside of the bottom plate 426 has click recesses 432 and 433 at both the sides of the through hole 428. As shown in FIGS. 18 and 19, the central portion of the backward downhill slope of the upper cover 417 has a hole 436 in which the shaft 427 is fitted. A rotation restraint pin 438 is affixed the backward downhill slope and is fitted in the guide hole 430. Click stops 434 and 435 project to the underside of the bottom plate 426 and are in such positions that the click stops 434 and 435 can be engaged in the click recesses 432 and 433.

Figure 21:
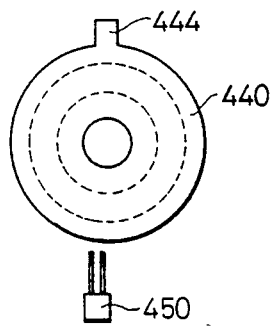
FIGS. 21 and 22 show the relationship between a flash control switch and a means for integrally providing the lamp housing in the body of the camera.
Figure 22:
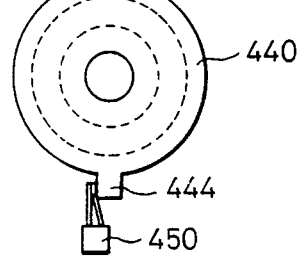

The shaft 427 is secured to a disk 440 inside the upper cover 417. Plan views of the disk 440 are shown in FIGS. 21 and 22. The lamp housing 412 is attached to the upper cover 417 by the disk 440 Springs 442 are interposed between the disk 440 and the inside surface of the upper cover 417 to always pull the lamp housing 412 toward the body of the camera to restrain the movement of the lamp housing in two positions in which the click stops 434 and 435 drop into the click recesses 432 and 433. The positions and forms of the guide hole 430, the pin 438, the click recesses 432 and 433 and the click stops 434 and 435 are determined so that the orientation shown in FIGS. 16 and 18 and that shown in FIGS. 17 and 19 are established in the above-mentioned two positions. Wires 39 electrically connect the flash tube 420 to a flash circuit (which is not shown in the drawings). If the flash circuit is provided in the lamp housing 412, a flash trigger signal, a quench signal and electric power are supplied through the wires 439.

FIGS. 21 and 22 show views of the disk 440 as seen from the pentaprism 416. The orientation shown in FIG. 21 is the same as that shown in FIG. 18, while the orientation shown in FIG. 22 is the same as that shown in FIG. 19. A projection 444 is provided on the peripheral portion of the disk 444. A flash control switch 450 of the flash circuit is provided near the disk 440 so that when the lamp housing 412 is oriented forwards, namely, a photographer intends to use the flash, the switch 450 is turned on by the projection 344. The switch 450 connects and disconnects the power supply of the flash circuit with its voltage increase circuit, connects and disconnects the voltage increase circuit with a main capacitor, or connects and disconnects the main capacitor with the flash tube 420.

When the photographer is to use the flash for photographing, all he needs to do is orient the lamp housing 412 forwards. When he is wishes to house the camera in a camera case or box, he orients the lamp housing 412 backwards to make the form of the whole camera easy to house.

In this embodiment, the switch of the flash is automatically turned on by orienting the lamp housing 412 forwards. Therefore, it can be immediately judged from the appearance of the camera whether the flash is in a usable state or not. When the flash is not in its used position, the lamp housing is so flat on the whole camera that it is easy to house the camera.

Although the front of the lamp housing 412 is slightly obstructive to the photographer seeing the object through the finder of the camera in the state shown in FIGS. 16 and 18, the obstructiveness can be eliminated by attaching a compensatory mask or the like to the finder.

The present invention can be applied not only to a single-lens reflex camera but also to other types of cameras. When the present invention is applied to the single-lens reflex camera, the light emission surface of a lamp housing can be placed in a high position because of the presence of the pentaprism so as to produce a desirable effect that the photographing lens of the camera is less obstructive. When the present invention is applied to a conventional compact camera of the lens shutter type, a projecting portion similar to the pentaprism casing of a single-lens reflex camera is provided at the center of the top of the compact camera and a lamp housing is provided on the backward downhill slope of the projecting portion.

According to the present invention, a flash can be compactly built in a camera. Since the light emission surface of the flash is located over the central axis of the camera, light can be uniformly irradiated upon an object such as a flower and an insect being photographed at a small distance from the camera.

A ninth embodiment of the present invention incorporating a display panel is hereafter described in detail with reference to the attached drawings.

Figure 23:
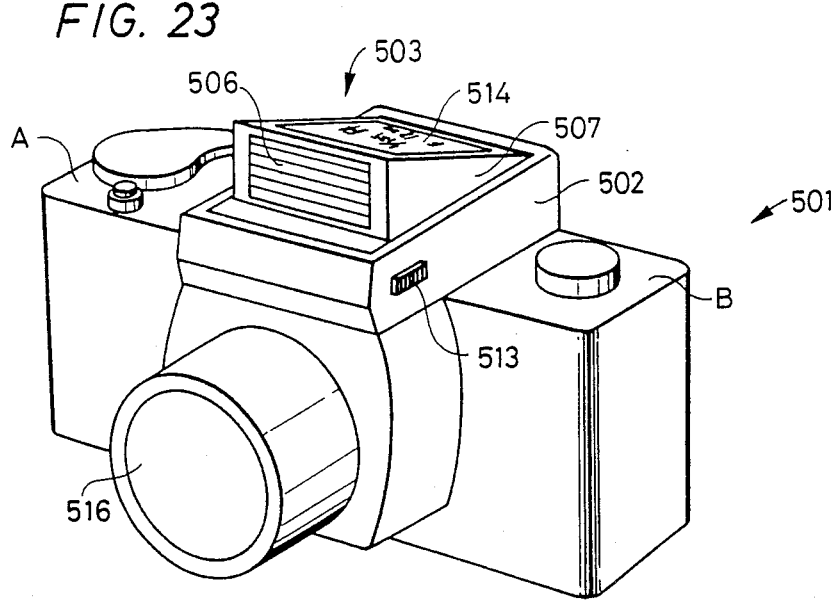
FIG. 23 shows a perspective view of a single-lens reflex camera which is a ninth embodiment of the present device and includes a movable flash section fitted with a display member.

FIG. 23 shows a perspective view of a single-lens reflex camera 501 which is this embodiment of the present device. A movable flash section 503 is mounted over the pentaprism section 502 of the camera 501.

Figure 24:
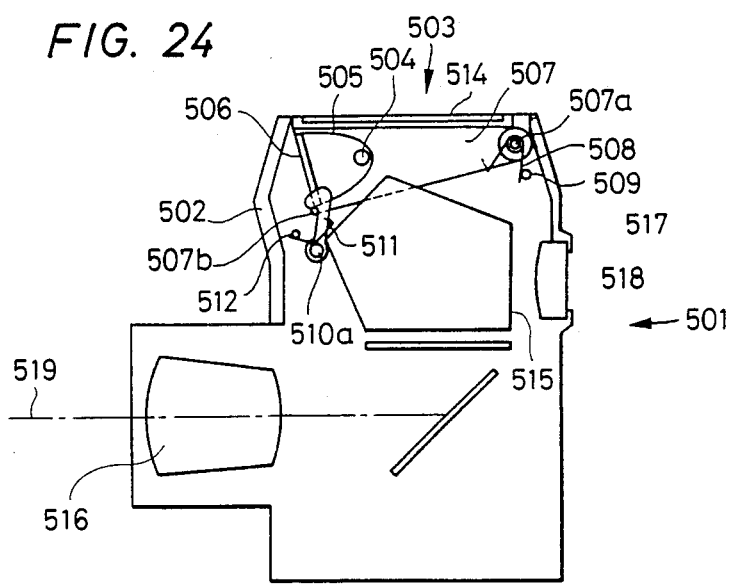
FIG. 24 shows a sectional view of the main part of the camera of FIG. 23.

FIG. 24 also shows a pentaprism 515 which is used for viewing through the main lens 516 and a viewing port 517 and an associated lens 518. An axis 519 of the main lens 516 defines a principal photographic direction.

FIG. 24 shows the construction of the movable flash section 503. The movable flash section 503 has a housing 507 wherein a light emission unit comprising a xenon tube 504, a parabolic reflector 505 surrounding the xenon tube 504 and a protective front glass 506 covering the front opening of the parabolic reflector 505 is provided at the front of the housing 507.

The housing 507 is supported at its rear with a shaft 507a on the body of the camera 501 at the pentaprism section 502. A torsion spring 508 is wound on the shaft 507a so that one end of the spring 508 is engaged with the edge of the housing 507 and the other end of the spring 500 is engaged with a pin 509 affixed to the camera body at the pentaprism section 502. The elastic restoring force of the torsion spring 508 always biases the housing 507 so as to turn it in such a direction that the light emission unit at the front of the housing is protruded from the pentaprisum section 501.

A pin 507b is affixed to a side portion of the housing 507 near its front. The pentaprism section 502 is provided with an engaging lever 510 on which a hook, which is engaged with the pin 507b, is provided at the tip of the lever 510. When the pin 507b is engaged to be stationary by the engaging lever 510, the housing 507 is held within the pentaprism section 502 despite the biasing force of the torsion spring 508.

The engaging lever 510 is supported at its butt end with a shaft 510a on the body of the camera 501. A torsion spring 511 is wound on the shaft 510a extending in parallel with the shaft 507a. One end of the torsion spring 511 is engaged with the edge of the engaging lever 510, while the other end of the torsion spring is engaged with a pin 512 affixed to the camera body. The elastic restoring force of the torsion spring 511 always biases the engaging lever 510 so as to turn it in such a direction that the lever 510 is engaged with the pin 507*b* of the housing 507.

In this embodiment, a means for disengaging the engaging lever 510 from the pin 507*b* is made of a sliding switch 513 provided on the outside of the pentaprism section 502. When the sliding switch 513 is caused to slide, the engaging lever 510 interlocked with the switch 513 is turned against the biasing force of the torsion spring 511 so that the engaging lever 510 is disengaged from the pin 507*b*. An electromagnetic plunger or the like may be provided instead of the sliding switch 513 in order to automatically protrude the housing 507 depending on a photographing condition.

An LCD display panel 514 is provided over the entire top of the movable flash section 503. The panel 514 shows desired information such as film information and flash information which includes exposure information on the speed of a shutter, the diameter of an aperture and the like, the sensitivity of the film, the number of photographed pictures, etc. When the movable flash section 503 is protruded, the LCD display panel 514 is inclined to directly face a photographer to enable him to very easily look at the panel 514.

Although the present device is described with reference to the embodiment above, the present device is not confined thereto. The movable flash section 503 is provided in the pentaprism section 502 in the embodiment described above, because the camera 501 is of the manual winding type. If the camera 501 was of the automatic winding type, the movable flash section 503 might be provided on a winding section A or a rewinding section B at the upper part of the camera body, because a winding lever and a rewinding lever do not need to be provided on the winding section A and the rewinding section B. In order to protrude the movable flash section 503, a conventional mechanism such as a mechanism which vertically slides the movable flash section on a guide may be used. The display panel is not confined to the LCD type, and may be made of light emission elements. The information to be shown on the display panel may be optionally selected depending on the functions of the camera and other considerations.

According to this embodiment of the present invention, a display panel for showing various pieces of information to a photographer is provided on the top of the movable flash section of a single-lens reflex camera as described above. For that reason, the size of the display panel can be made large without enlarging the camera itself. When the movable flash section is housed in the body of the camera, the camera can be easily handled and carried. Furthermore, the display panel can be easily seen.

What is claimed is:

1. A single-lens reflex camera comprising:
   a single-lens camera body having a principal photographic axis;
   a pentaprism included in said camera body over said principal photographic axis for operator viewing along said principal photographic axis;
   a moveable light emitter built into said camera body, disposed at least partially above said pentaprism and being moveable from an operating position protruded from said camera body to a non-operating position housed in said camera body; and
   a lifting mechanism disposed at least partially above said pentaprism for lifting said light emitter to said operating position protruded from said camera body from said non-operating position housed in said camera body, wherein said lifting mechanism includes levers rotatably supported near an upper front face of said pentaprism, said light emitter being rotatably supported at one end of each of said levers, guide grooves located over said pentaprism and extending in a front-to-rear direction of said camera, said light emitter being provided with sliding pins fitted in said grooves, biasing means for biasing at least one of said levers in such a direction as to protrude from said light emitter, and engaging means engaging a portion of said biased lever and releasing same when said light emitter is in the protruded position.

2. A single-lens reflex camera as recited in claim 1, further comprising an information display member mounted on a housing of said light emitter and electrically displaying conditions of said camera.

3. A single-lens reflex camera, comprising:
   a single-lens camera body having a principal photographic axis;
   a pentaprism included in said camera body over said principal photographic axis for operator viewing along said principal photographic axis;
   a movable light emitter built into said camera body, disposed at least partially above said pentaprism and being moveable from an operating position protruded from said camera body to a non-operating position housed in said camera body; and
   a lifting mechanism disposed at least partially above said pentaprism for lifting said light emitter to said operating position protruded from said camera body from said non-operating position housed in said camera body, wherein said lifting mechanism includes a linkage mechanism having at least two pivoting levers rotatably coupled at mid-portions thereof, at least one of said pivoting levers being secured to said camera body at a position above and in front of said pentaprism.

4. A single-lens reflex camera comprising;
   single-lens camera body having a principal photographic axis;
   a pentaprism included in said camera body over said principal photographic axis for operator viewing along said principal photographic axis;
   a movable light emitter built into said camera body, disposed at least partially above said pentaprism and being movable from an operating position protruded from said camera body to a non-operating position housed in said camera body; and
   a lifting mechanism disposed at least partially above said pentaprism for lifting said light emitter to said operating position protruded from said camera body from said non-operating position housed in said camera body, wherein said lifting mechanism and said light emitter in said non-operating position are disposed in a housing chamber of said camera above and in front of a front upper face of said pentaprism and wherein said operating position of at least a bulb part of said light emitter is above said chamber.

5. A single-lens reflect camera as recited in claim 4, wherein said lifting mechanism includes:
   guide plates projecting at both sides of an upper rear portion of said housing chamber;
   levers rotatably supported at both sides of an upper front portion of said housing chamber;

guide pins affixed to rear portions of sides of said light emitter and fitted in guide grooves of said guide plates;

rotational pins rotatably attaching tips of said levers to middle portions of sides of said light emitter;

tension springs biasing said levers to turn in such a direction as to lift said light emitter; and an engaging mechanism for engaging said levers at a standstill when said light emitter is located at said non-operating position in said housing chamber.

6. A single-lens reflex camera as recited in claim 5, wherein said engaging mechanism includes:

an engaging lever swingably supported on a side wall of said housing chamber and provided at one end with a hook engageable with one of said rotational pins when said light emitter is housed in said non-operating position in said housing chamber;

a slider provided on the rear of said camera body and slidable up and down;

a connecting rod swingably supported inside said camera body adjacent said pentaprism and coupling said slider and said engaging lever to each other; and a spring fitted on said connecting rod and biasing said engaging lever in such a direction as to engage said hook with said rotational pin.

7. A single-lens reflex camera, comprising:

a single-lens camera body having a principal photographic axis;

a pentaprism included in said camera body over said principal photographic axis for operator viewing along said principal photographic axis;

a movable light emitter built into said camera body, disposed at least partially above said pentaprism and being movable from an operating position protruded from said camera body to a non-operating position housed in said camera body;

a lifting mechanism disposed at least partially above said pentaprism for lifting said light emitter to said operating position protruded from said camera body from said non-operating position housed in said camera body; and a shoe mount on a top of said camera body for receiving a foot of an external flash unit, wherein said lifting mechanism is connected to said shoe for causing said lifting mechanism to return said light emitter to said non-operating position and housed in said camera body when said foot is inserted in said shoe.

8. A single-lens reflex camera as recited in claim 7:

wherein said shoe includes at least one notch at its bottom; and wherein said lifting mechanism includes:

at least one lever rotatably fitted on a shaft beneath said shoe and supporting said light emitter;

a projection of said lever being located in said notch of said shoe when said light emitter is in said non-operating position;

a spring biasing said lever to move said light emitter to said operating position; and an engaging member for selectively engaging said lever to keep said light emitter at said non-operating position.

9. A camera with a flash, comprising a camera body with a projecting portion at a top thereof projecting upwards and including an oblique rearward downward slope;

a flash included in a flash housing, said flash housing being rotatable on a surface of said slope from an operating position of said flash facing forwardly of said camera body to a non-operating position of said flash facing rearward; and a switch in said camera body cooperating with said flash housing to render said flash operable when it is in said operating position and inoperable when it is in said non-operating position.

10. A single-lens reflex camera, comprising:

a single-lens reflex camera body having principal photographic axis;

a pentaprism included in said camera body over said principal photographic axis for operator viewing along said principal photographic axis;

a movable light emitter built into said camera body, disposed and at least partially above said pentaprism and being movable from an opening position protruded from said camera body to a non-operating position housed in said camera body;

a stationary bulb and a stationary reflector disposed adjacent an upper facet of said pentaprism and directed obliquely upwards and backwardly;

a movable reflected movable from said non-operating position enclosing said stationary bulb and said stationary reflector within said camera body to said operating position to reflect light from said stationary bulb and said stationary reflector in alignment with said principal photographic axis;

biasing means for biasing said movable reflector to said operating position; and restraining means for relatively restraining said movable reflector at said non-operating position.

11. A single-lens reflex camera as recited in claim 10, wherein said movable reflector is removable and replaceable.

12. A single-lens reflex camera as recited in claim 10, wherein said movable reflector is one of a plane mirror, a convex mirror and a concave mirror.

13. A single-lens reflex camera as recited in claim 11, wherein said movable reflector is one of a plane mirror, a convex mirror and a concave mirror.

14. A single-lens reflex camera, comprising:

a single-lens reflex camera body having a principal photographic axis;

a pentaprism included in said camera body over said principal photographic axis for operator viewing along said principal photographic axis;

a movable light emitter built into said camera body, disposed at least partially above said pentaprism and being movable from an operating position protruded from said camera body to a non-operating position housed in said camera body;

wherein said light emitter is rotatably supported on said camera body, said non-operating position of at least a bulb part of said light emitter being over and behind said pentaprism, said camera further comprising drive means engaging said light emitter to rotate said light emitter to said operating position.

15. A single-lens reflex camera, comprising:

a single-lens reflex camera body having a principal photographic axis;

a pentaprism included in said camera body over said principal photographic axis for operator viewing along said principal photographic axis;

a movable light emitter built into said camera body, disposed at least partially above said pentaprism and being movable from an operating position protruded from said camera body to a non-operating position housed in said camera body;

wherein said camera body includes an upward projection over said pentaprism at a top center of said camera body including an oblique rear, downward slope;

wherein said light emitter includes a housing rotatable on a surface of said slope, whereby said light emitter is rotatable from said operating position facing forward to said non-operating position facing at least partially rearward;

said camera further including a switch installed in said camera body and operating with said light emitter housing to render said light emitter operable when said light emitter is in said operating position and to render said light emitter inoperable when said light emitter is in a non-operating position.

* * * * *